Figure 1:
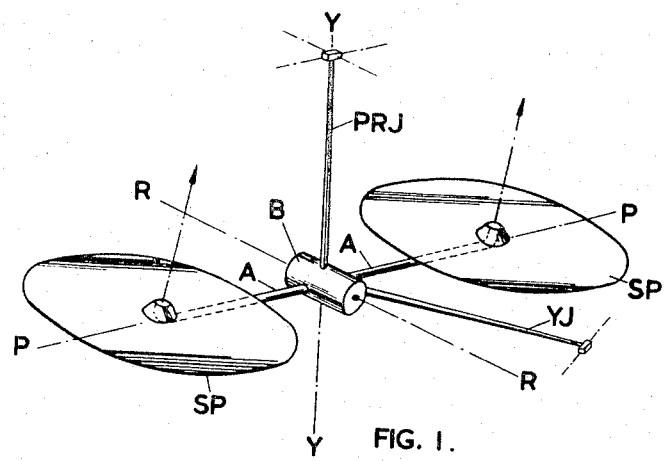

Aug. 15, 1967  N. S. REED  3,335,617
ROTARY JOINTS OR MOUNTINGS
Filed Dec. 21, 1964

2 Sheets—Sheet 1

Inventor
Neville Stanley Reed
By
Cushman, Darby & Cushman
Attorneys

Aug. 15, 1967  N. S. REED  3,335,617
ROTARY JOINTS OR MOUNTINGS
Filed Dec. 21, 1964  2 Sheets-Sheet 2

Inventor
Neville Stanley Reed
By
Cushman, Darby & Cushman
Attorneys

United States Patent Office 3,335,617
Patented Aug. 15, 1967

3,335,617
ROTARY JOINTS OR MOUNTINGS
Neville Stanley Reed, Farnham, Surrey, England, assignor to the Minister of Aviation in Her Majesty's Government of the United Kingdom of Great Britain and Northern Ireland, London, England
Filed Dec. 21, 1964, Ser. No. 419,724
Claims priority, application Great Britain, Dec. 23, 1963, 50,749/63
10 Claims. (Cl. 74—421)

This invention relates to rotary joints or mountings and especially to joints or mountings for connecting one unit to another for angular motion relative thereto about a given axis.

The invention has for an object to provide such a joint or mounting which may be hermetically sealed and through which a rotary drive may be transmitted from the one to the other of two units joined thereby.

In a rotary joint or mounting for connecting two units together for angular motion of the one relative to the other, according to the invention, two housings in, or for, said units contain two sets of bearings on straight end portions, respectively, of a rigid shaft and are themselves joined fixedly to the ends, respectively, of a flexible tubular member enclosing the intermediate portion of the rigid shaft, which latter is bent so that the flexible tubular member is also bent and rotation of the rigid shaft in the one set of bearings of the one (say a main) unit brings about rotation of the other end portion of the shaft about the axis of said one set of bearings, carrying with it the other set of bearings with the other bearing housing rotating thereon and so also the other (say an auxiliary) unit.

The axes of the straight portions of the rigid bent shaft may extend at right angles to one another so that rotation of the shaft about the axis of the one end portion thereof will cause the axis of its other end portion to describe a flat circular surface, or at a smaller angle less than ninety degrees, or at a greater angle than ninety degrees to one another.

Either or both of the two bearing housings may have associated therewith drive means for imparting rotation to the rigid bent shaft about the axis of the corresponding set of bearings. For example, a drive motor may be mounted on, or in, an extension of such housing which contains gear wheels drivingly connecting the motor to the shaft. Two drive means in the two housings, respectively, may be operative simultaneously to relieve the flexible tubular member of torque as may be desirable for precision operation.

The two bearing housings and the flexible tubular member which is joined fixedly thereto at its ends, respectively, may be such as totally to enclose, hermetically if desired, both the bent shaft and the two sets of bearings, with or without associated drive means as set forth; but, if desired, one, or both, of the bearing housings may be open, for example into the interior of one or both of two units connected by the joint or mounting.

The flexible tubular member may be comprised by a length of stainless steel or other flexible cylindrical bellows of known type. Also, one or more bearings or annular spacer members may be provided between the rigid shaft and the flexible tubular member at one or more points intermediately of their lengths. Thus, the flexible tubular member may be a composite one comprising two or more relatively short cylindrical bellows sections joined end to end and having one or more intermediate bearing members disposed internally at the one or more junctions of said sections. Such intermediate bearing members may have low friction faces of, or may be formed from, nylon or other low friction material and may be secured as by adhesive either to the composite or other flexible tubular member or to the shaft therein.

Rotary joints or mountings according to the invention are useful in connection with earth satellites or other space craft for joining together two units for relative rotation or angular motion, because the hermetical enclosure that is possible can be used to protect the bearings against the potentially harmful, high vacuum, outer space environment.

Figure 2:
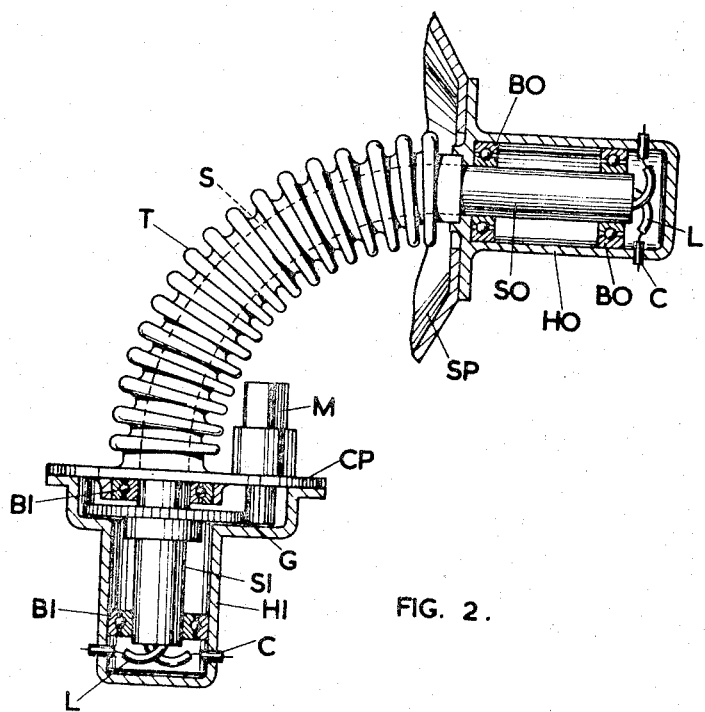
Figure 3:
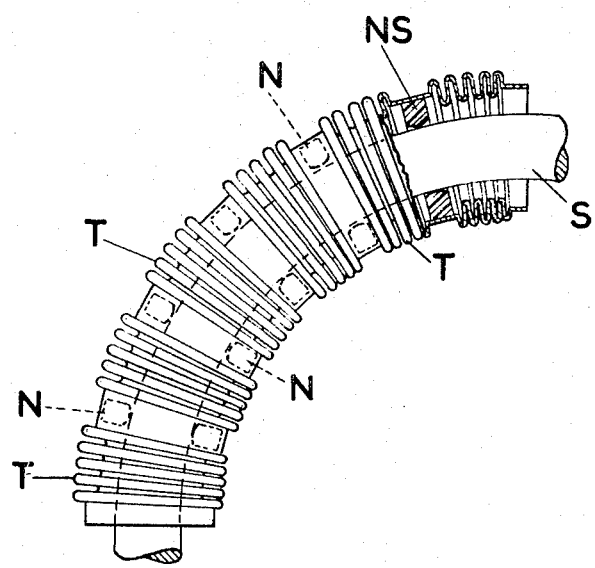

The invention is illustrated by the accompanying diagrammatic drawings of which:

FIGURE 1 is a perspective view of an earth satellite using two rotary joints or mountings according to the invention, FIGURE 2 shows greatly enlarged as compared with FIGURE 1, one form of rotary joint or mounting in accordance with the invention adapted for use in a satellite like that of FIGURE 1, and FIGURE 3 shows one form of composite flexible tubular member having intermediate bearings or spacer members. None of these figures is drawn to scale.

The satellite shown is for use in an equatorial orbit and comprises a hollow cylindrical body B, whose longitudinal axis is coincident with the roll axis R—R and at all times tangential to the orbital path, with a vertical yaw axis Y—Y passing through the earth's centre and a horizontal pitch axis P—P; pitch and roll jets from nozzles at the end of a rigid stem PRJ and a yaw jet from a nozzle at the end of a rigid stem YJ serving to maintain the satellite in this attitude.

Two like tubular arms A, A extend from opposite sides of the body B along the pitch axis P—P and carry two like solar paddles SP which are mounted at their ends for rotation about the pitch axis P—P by means of two like rotary joints or mountings according to the invention.

Each of these joints, see FIGURE 2, has a rigid, tubular shaft S which is of arcuate formation between straight inner and outer end portions SI and SO thereof, whose axes intersect one another at right angles. The inner end portion SI of the shaft is carried by a set of two inner bearings BI in a cup-like inner bearing housing HI secured to the outer end of the corresponding tubular arm A (not shown in FIGURE 2) coaxially of the latter. The outer end portion SO of the shaft carries a set of two outer bearings BO in a cup-like outer bearing housing HO which is flanged at its inner end and has a saucer-like solar paddle SP (part only of which is shown in FIGURE 2), secured to an external flange thereof at its inner end.

At one end thereof the inner bearing housing HI is of enlarged transverse dimensions to accommodate a self-enclosed type electric drive motor M on a cover plate CP thereof and gearing G by which the latter is connected to rotate the inner end SI of the shaft S in the bearings BI. A flexible, cylindrical bellows member T of stainless steel encloses the shaft S between the inner and outer bearing housings HI and BI to which its ends are secured and hermetically sealed.

The bearings BI and BO may be of any known or convenient type as they are fully enclosed against the hard vacuum conditions prevailing along the orbital path of the satellite.

The solar-paddles SP carry solar cells for producing electrical energy when subject to sunlight and are rotated about the pitch axis of the equatorial satellite to maintain them facing towards the sun despite the pitching motion of the satellite body B as it orbits the earth.

It will be observed that, as the flexible metal tube T is secured at its ends respectively to the cover plate CP of the inner bearing housing HI and the flanged end of the outer bearing housing HO, rotation of the inner end portion SI of the shaft S in the inner bearings BI would not be possible without rotation of the outer bearing housing HO on the outer bearings BO on the outer end portion SO of the shaft S. The outer bearing housing HO rotates about the outer end SO of the shaft S together with the outer end of the bellows T and the solar-paddle SP, once per revolution of the inner end SI of the shaft in the inner bearings BI and advantage is taken of this to convey electrical energy from the solar cells on the paddles SP to the satellite body B simply by means of insulated connectors C, C through the walls of the bearing housings and flexible leads L, L extending therebetween through the interior of the hollow shaft S, no slip rings or brushes being needed.

It is desirable in the interest of long fatigue life of cylindrical bellows of the type illustrated that there should be no substantial rubbing or any frictional contact therewith during use. For this reason and as shown in FIGURE 3 of the drawings, the one-piece flexible member T of an arrangement as illustrated in FIGURE 2 may be replaced by a composite one comprising six relatively short lengths T, T . . . of stainless steel or other metal bellows which are secured together as by soldering and five bearing members in the form of bushes N, N . . . of nylon or other low friction material secured as by adhesive to said bellows lengths at their joined ends. These bearing members need not be a close fit on the shaft S and advantageously are of D-shaped cross-section with the straight side of the D outermost as shown at NS in FIGURE 3.

It is also desirable, at least in some cases, that the bellows or other flexible member or members used in any particular case should not be subjected to tension or extended beyond its natural length either locally or as a whole. By using a one-piece or a composite bellows or other flexible member of sufficient natural overall length greater than the length of that part of the bent shaft which is enclosed thereby, it can readily be ensured that no part of said one-piece or composite member shall be subject to tension in use.

I claim:

1. A rotary joint for connecting two units together for angular motion of the one relatively to the other which comprises two bearing housings, a rigid bent shaft having straight end portions which latter are journalled in said housings, respectively and a flexible tubular member enclosing the intermediate portion of said shaft and secured fixedly at its ends to said housings, respectively, whereby rotation of the shaft in the one bearing housing about the axis of the corresponding straight end portion of the shaft brings about rotation about said axis of the other end of the shaft accompanied by rotation of the other bearing housing thereon, the bearing housings and the flexible tubular member which is joined fixedly thereto at its ends, respectively together comprising a hermetically sealed enclosure.

2. A rotary joint as claimed in claim 1, wherein at least one of the two bearing housings has drive means for imparting rotation to the rigid bent shaft about the axis of the corresponding straight end portion of the latter.

3. A rotary joint as claimed in claim 2, wherein at least one of the two bearing housings has an extension which accommodates a drive motor and gear means drivingly connecting the latter to the shaft.

4. A rotary joint as claimed in claim 1, wherein the flexible tubular member is comprised by a length of a flexible cylindrical bellows.

5. A rotary joint as claimed in claim 4 having at least one intermediate bearing member between the flexible tubular member and the rigid bent shaft intermediately of their lengths.

6. A rotary joint as claimed in claim 4, wherein the flexible tubular member is a composite one comprising a plurality of relatively short cylindrical bellows sections joined end to end and having a plurality of intermediate bearing members disposed internally thereof at the junctions of said bellows sections.

7. A rotary joint as claimed in claim 1 wherein at least one of the bearing housings has insulating electrical connector means extending through the wall thereof and electrical leads extend from said connector means and through the flexible tubular member to the other bearing housings.

8. A rotary joint as claimed in claim 7 wherein the rigid bent shaft is hollow and has the electrical leads extending through it.

9. A rotary joint for connecting two units together for angular motion of the one relatively to the other which comprises:

two cup-like bearing housings each having two coaxially spaced journal bearings therein, a rigid bent shaft having straight end portions which are journalled in said bearings in said bearing housings, respectively, whereby rotation of the shaft in one bearing housing about the axis of the corresponding straight end portion of the shaft brings about rotation about said axis of the other end of the shaft, a flexible tubular member comprised by at least one flexible cylindrical bellows member and which is joined, fixedly at its ends to the bearing housings, respectively, to enclose the bent rigid shaft between the latter;

at least one of the two bearing housings accommodating an electric motor fixedly secured thereto and gearing drivingly connecting said motor to the corresponding end of the rigid bent shaft; said bearing housings and the flexible tubular member constituting a hermetically sealed enclosure containing the journal bearings and the bent rigid shaft; said shaft being hollow and the two cup-like bearing housings having insulated electrical connectors extending through their walls, whilst electrical leads extend from the connectors of the one housing through the shaft to the connectors of the other housing.

10. A rotary joint as claimed in claim 9, wherein the flexible tubular member is comprised by a plurality of relatively short cylindrical bellows sections joined end to end, and having a plurality of low friction material annular bearing members secured thereto internally at the junction of said bellows sections.

References Cited

UNITED STATES PATENTS

| | | | |
|---|---|---|---|
| 326,941 | 9/1885 | Browne | 64—2 |
| 2,135,835 | 11/1935 | Papello | 64—2 |
| 2,412,705 | 12/1946 | Jaques | 64—2 |
| 2,467,849 | 4/1949 | O'Brien et al. | 74—421.5 |
| 2,683,341 | 7/1954 | Kock | 64—2 X |
| 2,761,297 | 9/1956 | Buchsteiner | 64—2 |
| 2,821,092 | 1/1958 | Cordora et al. | 64—2 |

FRED C. MATTERN, JR., *Primary Examiner.*

DAVID J. WILLIAMOWSKY, *Examiner.*

C. J. HUSAR, *Assistant Examiner.*